United States Patent
Tokunaga

(10) Patent No.: US 7,526,780 B2
(45) Date of Patent: Apr. 28, 2009

(54) DISC APPARATUS

(75) Inventor: Tomoshi Tokunaga, Kanagawa-Ken (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 471 days.

(21) Appl. No.: 11/401,562

(22) Filed: Apr. 11, 2006

(65) Prior Publication Data
US 2006/0259917 A1 Nov. 16, 2006

(30) Foreign Application Priority Data

| May 10, 2005 | (JP) | ............................ 2005-137888 |
| Jan. 19, 2006 | (JP) | ............................ 2006-010821 |

(51) Int. Cl.
*G11B 33/14* (2006.01)

(52) U.S. Cl. .................................................. 720/649

(58) Field of Classification Search ................. 720/649; 360/97.02, 98.07
See application file for complete search history.

(56) References Cited

U.S. PATENT DOCUMENTS

| 5,909,339 | A | * | 6/1999 | Hong | ....................... 360/98.07 |
| 6,407,879 | B1 | * | 6/2002 | Fruge' et al. | .............. 360/97.02 |
| 6,466,398 | B1 | * | 10/2002 | Butler et al. | .............. 360/97.02 |
| 6,989,959 | B2 | * | 1/2006 | Chang et al. | .............. 360/97.02 |
| 7,002,773 | B2 | * | 2/2006 | Kang et al. | ............... 360/97.02 |
| 2001/0048571 | A1 | * | 12/2001 | Boutaghou | ............... 360/97.02 |

FOREIGN PATENT DOCUMENTS

| JP | 2001110175 A | * | 4/2001 |
| JP | 2001-250301 | | 9/2001 |

* cited by examiner

*Primary Examiner*—Tianjie Chen
(74) *Attorney, Agent, or Firm*—Renner, Kenner, Greive, Bobak, Taylor & Weber

(57) ABSTRACT

A disc apparatus for recording or reading data to or from a disc includes a tray having a table on which the disc is placed and a shielding member that covers the tray. The shielding member has a circular opening and a plurality of arc protruding members. Each arc protruding member is provided on an inner surface of the shielding member that covers the tray as protruding towards an upper surface of the disc placed on the table of the tray. An end of each arc protruding member is situated near the opening. Each arc protruding member has a protruding end with a height ranging from 1.0 mm to 1.5 mm from the inner surface of the shielding member.

7 Claims, 11 Drawing Sheets

AIRFLOW

AIRFLOW

DISC APPARATUS

CROSS-REFERENCE TO RELATED APPLICATIONS

This application is based on and claims the benefit of priority from the prior Japanese Patent Application No. 2005-137888 filed on May 10, 2005 and No. 2006-010821 filed on Jan. 19, 2006, the entire contents of which are incorporated herein by reference.

BACKGROUND OF THE INVENTION

The present invention relates to a disc apparatus for writing, reading, etc., to and from a disc such as a CD (Compact Disc) and a DVD (Digital Versatile Disc). Particularly, this invention relates to a disc apparatus operable to restict disc floating due to motor rotation.

Disc apparatuses are known in use for writing, reading, etc., to and from a disc such as a CD and a DVD with an optical pickup while an installed disc is rotating at a high speed. The disc is set by a clamp mechanism on and rotated on a turntable that is rotated by a turntable motor.

In such a disc apparatus, when a disc is rotating at a high speed of 8,000 rpm or higher, air near the disc surface is also rotating and flowing from the disc inner to outer sections due to a centrifugal force. This airflow causes decrease in air pressure over the disc inner section, which could force the disc to float over the turntable. A larger force to make disc floating than a damping force by the clamp mechanism could force the disc to be released from the turntable against the clamping force.

A technology to avoid such disc floating is disclosed, for example, in Japanese Unexamined Patent Publication No. 2001-250301. Illustrated in FIG. 14 is a top plate (shielding member) 102 that covers the housing of a disc apparatus disclosed in this document. FIG. 14 shows the surface of the top plate 102 that faces the upper surface of a disc 2. The top plate 102 is provided with several arc protruding members 104 from the disc inner to outer sections. The protruding members 104 force air to flow from the disc outer to inner sections to restrict decrease in air pressure over the inner section, thus restricting disc floating.

The inventor of the present invention examined this technology and found out that disc floating cannot be restricted enough unless the configuration of the protruding members 104 is optimally determined. In detail, decrease in air pressure over the disc inner section depends on the height and/or the number of the protruding members 104, a gap between the disc 2 and the members 104, etc., which could result in insufficient floating restriction.

SUMMARY OF THE INVENTION

A purpose of the present invention is to provide a disc apparatus that effectively restricts disc floating over a turntable while the disc is rotating at a high speed.

The present invention provides a disc apparatus for recording or reading data to or from a disc comprising: a tray having a table on which the disc is placed; and a shielding member that covers the tray, the shielding member having a circular opening and a plurality of arc protruding members, each arc protruding member being provided on an inner surface of the shielding member that covers the tray as protruding towards an upper surface of the disc placed on the table, an end of each arc protruding member being situated near the opening, and each arc protruding member having a protruding end with a height ranging from 1.0 mm to 1.5 mm from the inner surface of the shielding member.

DETAILED DESCRIPTION OF PREFERRED EMBODIMENT

Figure 1:
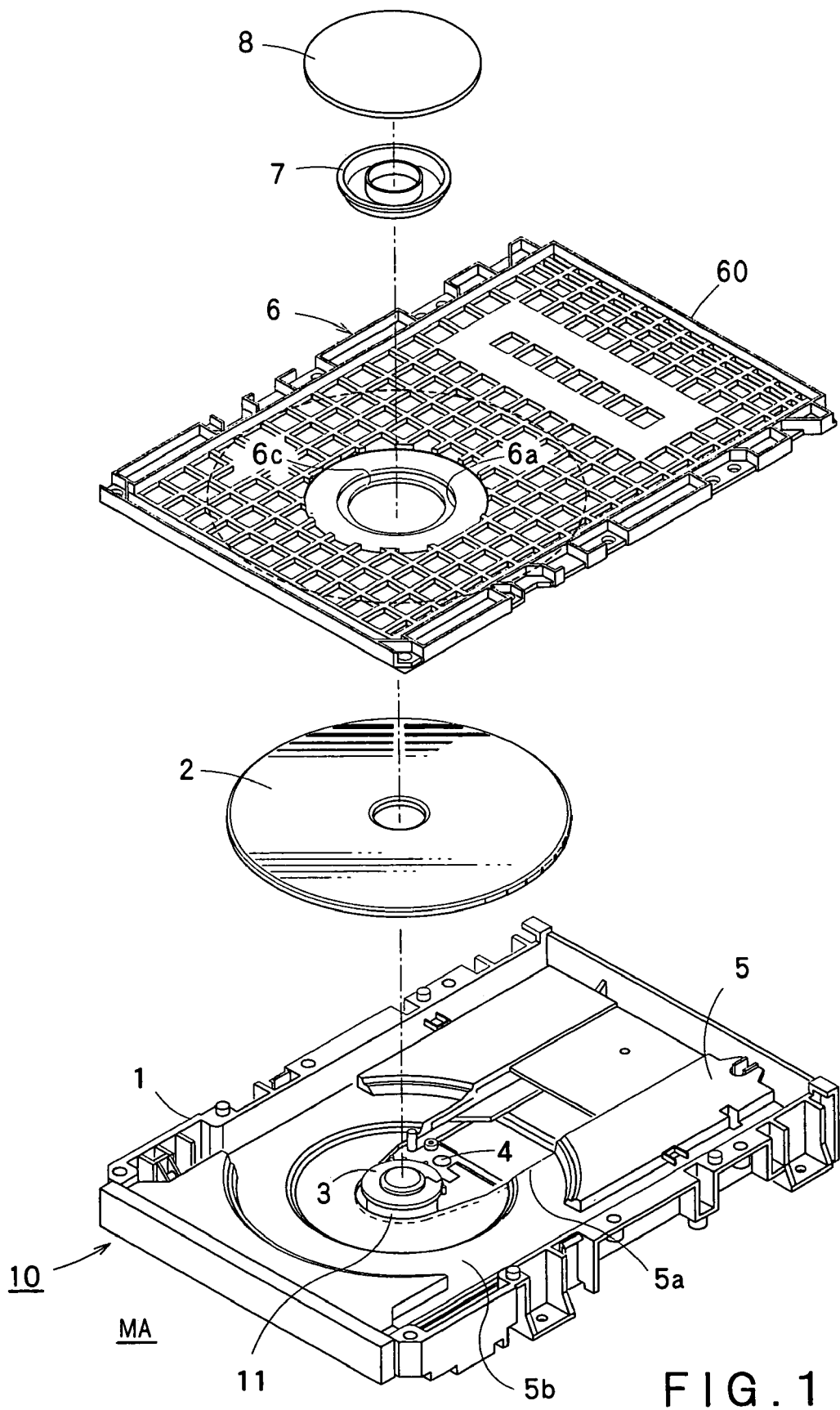
FIG. 1 is an exploded perspective view of a disc apparatus according to an embodiment of the present invention.

FIG. 1 is an exploded perspective view of a disc apparatus MA according to an embodiment of the present invention. The disc apparatus MA is enclosed in a box-like housing 10. The housing 10 consists of an open-top housing body 1 and a top plate (shielding member) 6 that covers the top of the housing body 1. This structure achieves an air-tight condition in the housing 10 with substantially no contamination of dust, etc.

Figure 5:
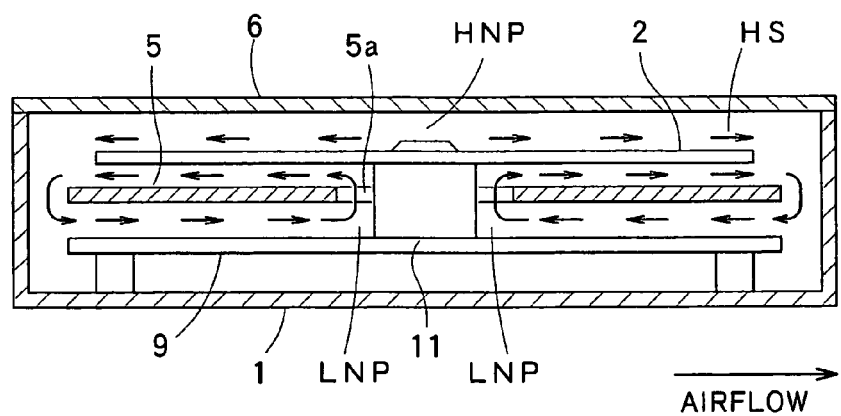
FIG. 5 is a cross-sectional view of the known disc apparatus.

Provided in the housing 10 is a turntable 3 attached to a rotational shaft of a motor 11 that is a spindle motor. A disc 2 is detachably set on the turntable 3. An optical pickup 4 is installed in the turntable 3 as reciprocally movable under the disc 2 in a radius direction of the disc. The pickup 4 is used in recording or reproduction to and from the disc 2. The motor 11 is mounted on a base 9 fixed to the housing body 1, as shown in FIG. 5 which will be described later.

The housing body 1 is provided with a tray 5 for loading and unloading the disc 2 onto and from the turntable 3. The tray 5 is reciprocally movable in a horizontal direction through a guide slot (not shown) formed at one end of the body 1. The tray 5 is narrower than the body 1 so that there is a gap between each sidewall of the tray 5 in a longitudinal direction in which the tray 5 moves and the corresponding inner wall of the body 1. The tray 5 is provided with an opening 5a that corresponds to the locations of the motor 11 and the optical pickup 4, and also a table 5b on which the disc 2 is placed.

The disc 2 is placed on the table 5b of the tray 5 pulled from the housing body 1 and guided into the body 1. Once the disc 2 is guided, the turntable 3 ascends towards a clamp mechanism 7 which will be described later. The disc 2 is then set on the turntable 3 and fixed thereon by the clamp mechanism 7. The disc 2 rotates as separated from the table 5b.

Figure 2:
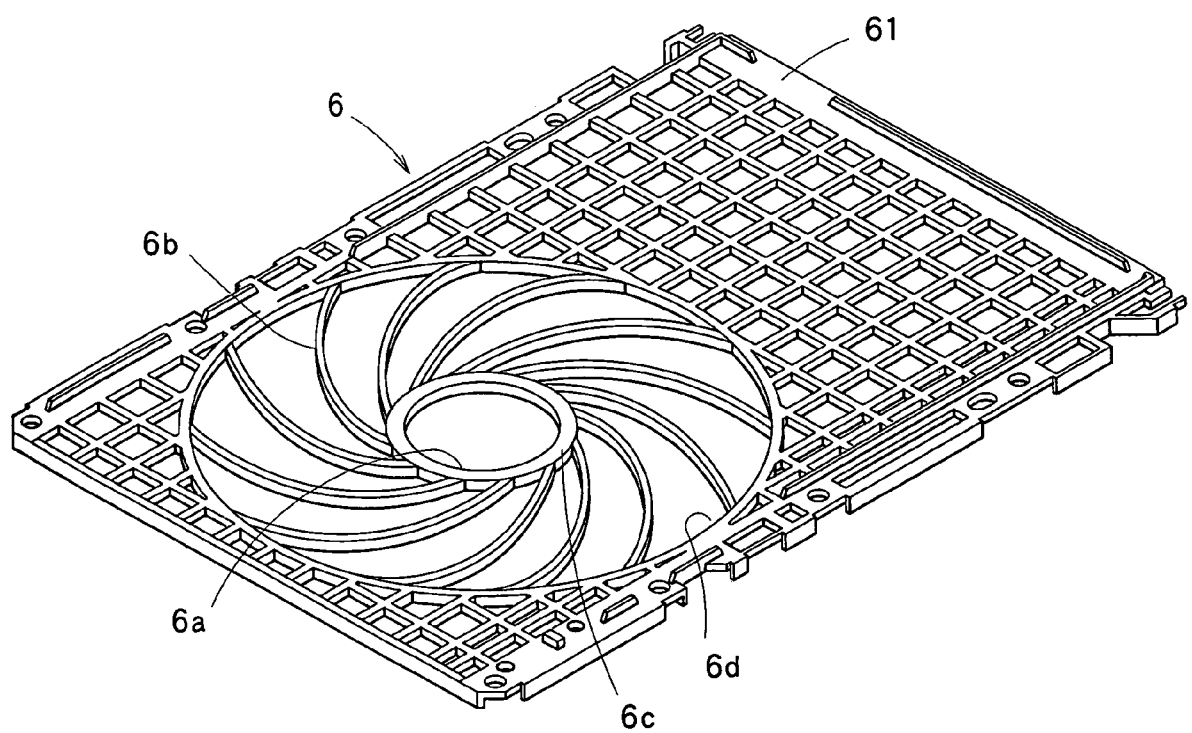
FIG. 2 is a perspective view of the inner surface of a top plate according to the embodiment of the present invention.

The top plate 6 is provided with a circular opening 6a with a thick circular wall portion 6c, as shown in FIG. 1 and also FIG. 2. Installed in the opening 6a is the clamp mechanism 7 for fixing the disc 2 on the turntable 3. Provided on an outer surface 60 of the plate 6 is a cover 8 that covers the mechanism 7 installed in the opening 6a. The center of the opening 6a substantially meets the rotational center of the turntable 3.

FIG. 2 shows a perspective view of an inner surface 61 of the top plate 6, provided with protruding members, that faces the tray 5 and also the upper surface of the disc 2 placed on the table 5b of the tray, according to the embodiment of the present invention.

Provided on the inner surface 61 is a circumferential portion 6d concentric with the opening 6a. Also provided on the inner surface 61 are several protruding members 6b, as an airflow guiding means, each formed as an arc starting from the thick wall portion 6c to the circumferential portion 6d and connecting these portions.

The arc protruding members 6b are formed in such a manner that all of the protruding portions are oriented in the same direction. The members 6b are formed as an arc, but may not be a complete arc. As disclosed later in detail, the members 6b guide an airflow generated due to rotation of the disc 2 to the rotation center.

In this embodiment, the protruding members 6b are formed as arcs with the same radius. The starting points of the arcs are separated from one another along the circumference of the thick wall portion 6c. In FIG. 2, the starting points of the arcs are separated from one another with the constant interval.

In recent disc apparatuses, a disc rotation speed reaches around 10,000 rpm for high-speed recording. Moreover, as described above, the disc apparatus MA has an air-tight structure with almost no contamination of dust. Therefore, when the disc 2 is rotating at a high speed, air present over and under the disc also rotates and then flows from the disc inner to outer sections due to a centrifugal force, which results in decrease in air pressure over the disc inner section.

Figure 3:
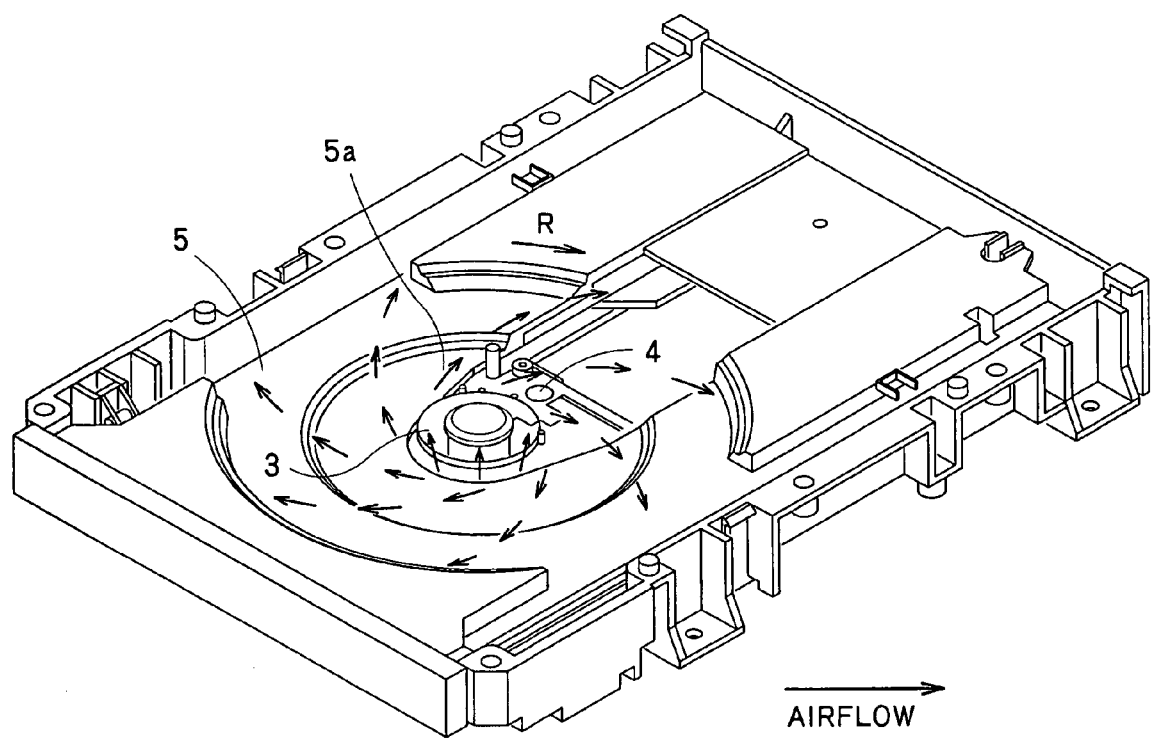
FIG. 3 is a perspective view illustrating an airflow under the lower surface of a disc, for the disc apparatus according to the embodiment of the present invention and a known disc apparatus.
Figure 4:
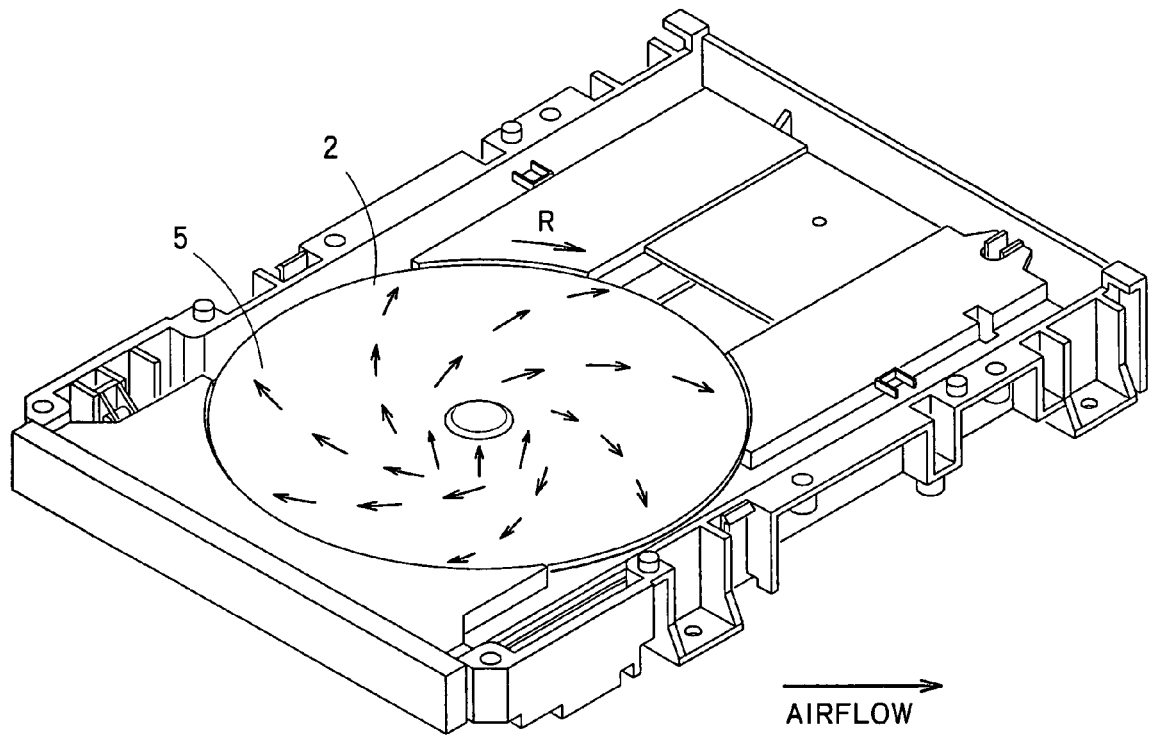
FIG. 4 is a perspective view illustrating an airflow over the upper surface of the disc, for the disc apparatus according to the embodiment of the present invention and the known disc apparatus.

Such airflow will be discussed briefly for the disc apparatus MA and a known disc apparatus with no protruding members, with reference to FIGS. 3 and 4. FIG. 3 is a perspective view illustrating an airflow under the surface to be recorded (disc lower surface) of the disc 2 for the disc apparatus MA and the known disc apparatus. FIG. 4 is a perspective view illustrating an airflow over the surface (disc upper surface) opposite to that surface of the disc 2 for the apparatus MA and the known apparatus.

As illustrated in FIGS. 3 and 4, air rotates over and under the disc 2 rotating in a direction indicated by an arrow R and then flows from the disc inner to outer sections due to a centrifugal force.

FIG. 5 is a cross-sectional view of the known disc apparatus. In detail, FIG. 5 illustrates airflows corresponding to FIGS. 3 and 4 when viewed from the cross-section of the known apparatus.

The elements of the known disc apparatus that correspond to those of the disc apparatus MA are given the same reference numeral throughout the drawings.

Under the disc 2, an airflow circulates as indicated by arrows in FIG. 5. In detail, the airflow from the disc inner to outer sections over the tray 5 turns downwards at the disc outer edge, moves from the disc outer to inner sections under the tray, and ascends through the opening 5a of the tray. The air circulation does not cause decrease in air pressure under the disc inner sections, resulting in a low negative air pressure LNP.

In contrast, air over the disc 2 just moves from the disc inner to outer sections at a high speed HS with no passage to flow from the outer to inner sections. This causes decrease in air pressure over the disc inner section, resulting in a higher negative air pressure HNP over the disc 2 than thereunder. When the disc 2 rotates at a high speed, a force to make the disc float upwards is generated due to decrease in air pressure over the disc inner section, which could force the disc to be released from the damp mechanism 7.

Figure 6:
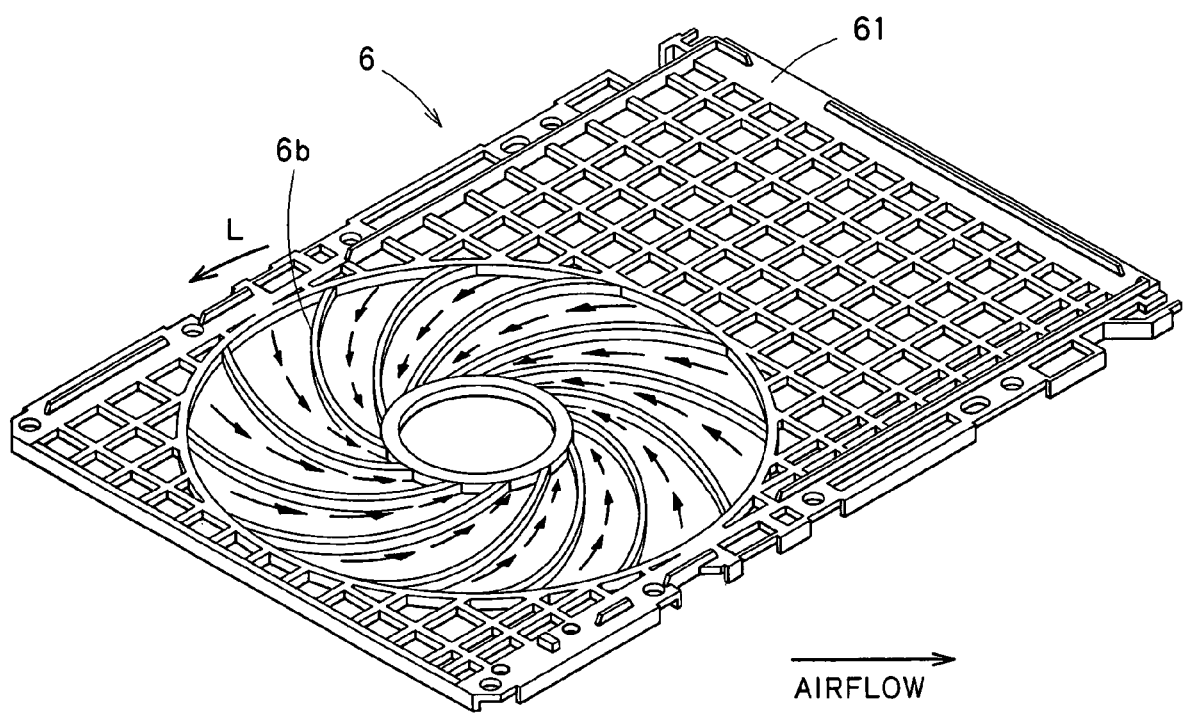
FIG. 6 is a perspective view illustrating an airflow near protruding members in the disc apparatus according to the embodiment of the present invention.

FIG. 6 is a perspective view illustrating an airflow near the protruding members 6b in the disc apparatus MA (the embodiment of the present invention) when viewed from the inner surface 61 of the top plate 6.

As indicated by arrows in FIG. 6, the airflow generated when the disc 2 is rotating in a direction indicated by an arrow L is guided towards the disc rotation center by the protruding members 6b.

Figure 7:
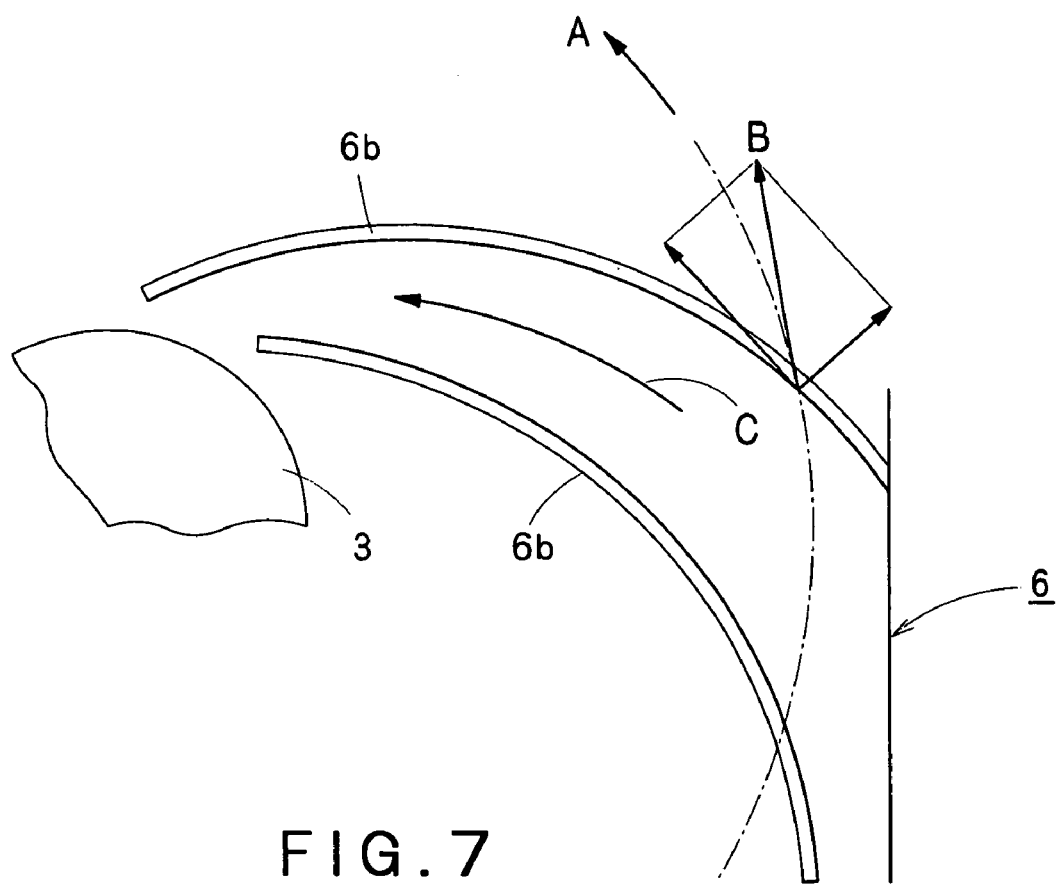
FIG. 7 is an enlarged view of a part of the protruding members according to the embodiment of the present invention.

FIG. 7 is an enlarged view of a part of the arc protruding members 6b. When the disc 2 rotates in the direction indicated by an arrow A, an airflow is generated and moves in the direction indicated by an arrow B due to a centrifugal force. The airflow moving in the arrow-B direction, however, collides with an arc protruding member 6b and changes its direction to the tangent of the arc of the member 6b. Then, the airflow moves in the direction indicated by an arrow C along the arc towards the disc rotation center.

As closer to the disc rotation center, the passages for the guided airflow become narrower, air pressure near the disc rotation center increases according to Bernoulli's principle. This serves to prevent the disc 2 from being released from the clamp mechanism 7 at a high rotation speed, which could otherwise occur when no such protruding members are provided.

Figure 8:
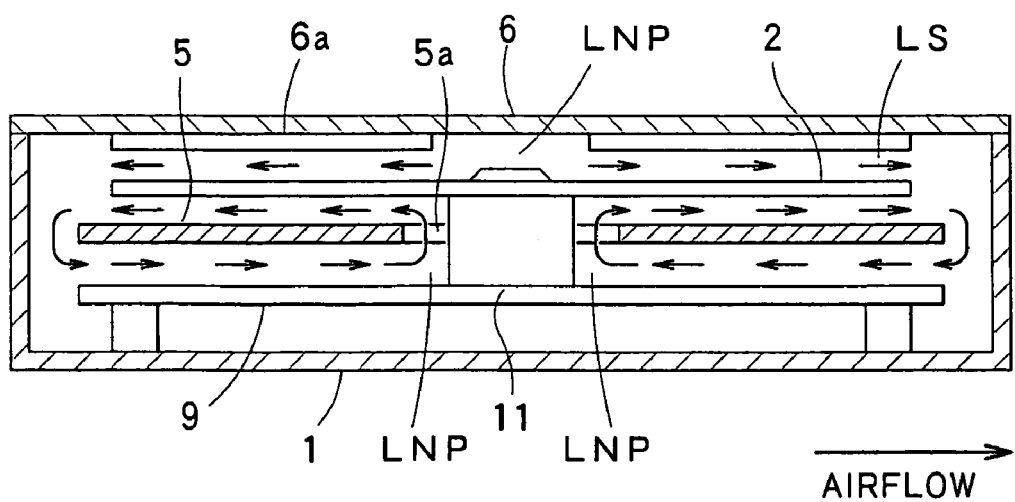
FIG. 8 is a cross-sectional view of the disc apparatus having the protruding members according to the embodiment of the present invention.

FIG. 8 is a cross-sectional view of the disc apparatus MA having the protruding members 6b, according to the embodiment of the present invention. In detail, FIG. 8 illustrates airflows corresponding to FIGS. 3, 4 and 6 when viewed from the cross-section of the apparatus MA.

Under the disc 2, an airflow circulates like shown in FIG. 5. In detail, the airflow from the disc inner to outer sections over the tray 5 turns downwards at the disc outer edge, moves from the disc outer to inner sections under the tray, and ascends through the opening 5a of the tray. The air circulation does not cause decrease in air pressure under the disc inner section, resulting in a low negative air pressure LNP.

In contrast, there are two types of airflows over the disc 2: one moving from the disc inner to outer sections; the other moving towards the disc rotation center with the help of the protruding members 6b, as discussed above.

The airflow from the disc inner to outer sections in this embodiment is slower than that with no such protruding members 6b, at a speed LS slower than HS in FIG. 5. Such a slower airflow restricts decrease in air pressure near the disc rotation center, resulting in a lower negative air pressure LNP. This serves to restrict the disc 2 from floating upwards and prevent it from being released from the clamp mechanism 7 at a high rotation speed.

Figure 9:
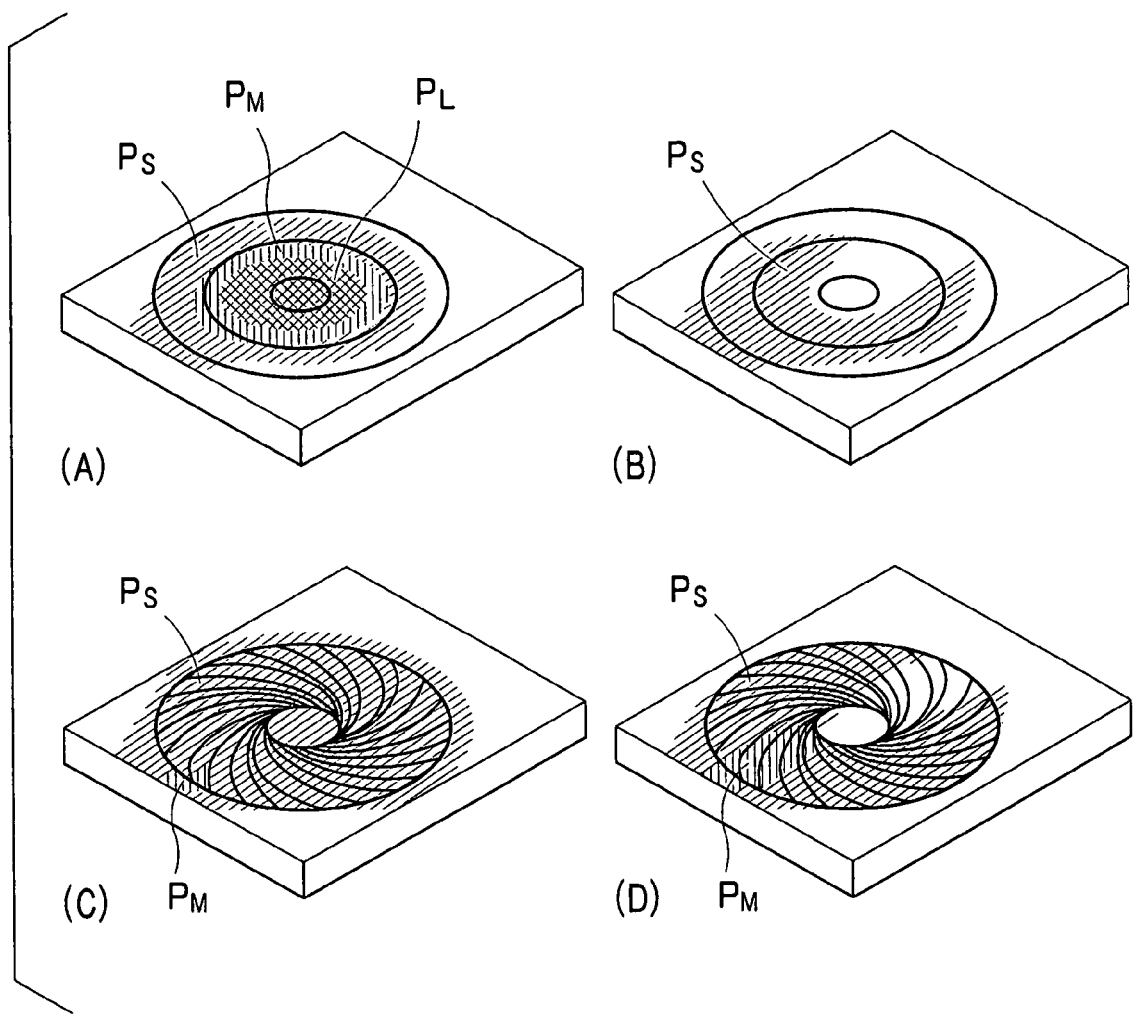
FIG. 9 is a view illustrating simulation results of air pressure applied to the lower and upper surfaces of a disc, with or without the protruding members, according to the embodiment of the present invention.

Illustrated in FIG. 9 are simulation results of air pressure applied to the lower surface for recording or the opposite upper surface of the disc 2, with or without the protruding members 6b according to the embodiment of the present invention.

A figure (A) in FIG. 9 illustrates a negative air pressure applied to the disc upper surface, without the protruding members 6b on the top plate 6. A figure (B) in FIG. 9 illustrates a negative air pressure applied to the disc lower surface, without the protruding members 6b on the top plate 6.

A figure (C) in FIG. 9 illustrates a negative air pressure applied to the disc upper surface, with the protruding members 6b on the top plate 6. A figure (D) in FIG. 9 illustrates a negative air pressure applied to the disc lower surface, with the protruding members 6b on the top plate 6.

The figures (C) and (D) in FIG. 9 show simulation results for which 24 protruding members 6b were provided on the top plate 6.

The same disc apparatus was employed in simulation through the figures in FIG. 9 except that the top plate 6 had a flat surface without the protruding members 6b for simulation in the figures (A) and (B).

Simulation in the figure (A) in FIG. 9 shows the highest negative air pressure $P_L$ near the disc rotation center; a medium negative air pressure $P_M$ lower than $P_L$; and the lowest negative air pressure $P_S$, as closer to the disc outer section, i.e., the near the rotation center, the larger the decrease in air pressure. Simulation in the figure (B) in FIG. 9 shows an almost constant low negative air pressure $P_S$ under the disc lower surface.

The figures (A) and (B) in FIG. 9 teach a higher negative air pressure is applied to the disc upper surface, particularly near the disc rotation center, than the lower surface when no protruding members 6b are provided on the top plate 6.

Simulation in the figure (C) in FIG. 9 shows an almost constant low negative air pressure $P_S$ over the disc upper surface, with a negative air pressure $P_M$ applied only to a part of the upper surface. Simulation in the figure (D) in FIG. 9 also shows an almost constant low negative air pressure $P_S$ under the disc lower surface, with a negative air pressure $P_M$ applied only to a part of the lower surface.

The figures (C) and (D) in FIG. 9 teach an almost equal negative air pressure is applied to the disc upper and lower surfaces when the protruding members 6b are provided on the top plate 6.

According to the simulations through the figures in FIG. 9, it is found that the protruding members 6b provided on the top plate 6 in the disc apparatus MA, the embodiment of the present invention, serve to provide an almost constant negative air pressure to the disc upper surface and also almost equal negative air pressures to the disc upper and lower surfaces.

Discussed next is how the protruding members 6b affect airflows in the disc apparatus MA, according to the embodiment of the present invention.

Simulations of air pressures applied to the disc upper and lower surfaces were performed at a rotation speed of 8,000 rpm with parameters: height and the number of the protruding members 6b provided on the top plate 6, and gap between the disc 2 and the members 6b.

Simulation results are shown in TABLES 1 to 3 with three categories: BEST for almost no air-pressure difference between the disc upper and lower surfaces; GOOD for a small difference therebetween; and NG (No Good) for a big difference therebetween.

Figure 10:
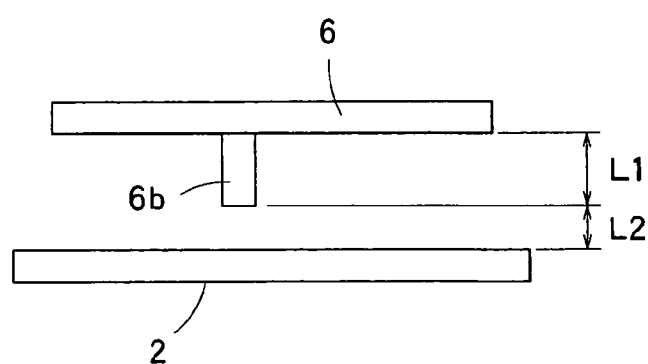
FIG. 10 a view indicating dimensions related to the protruding members according to the embodiment of the present invention.

Defined in FIG. 10 are dimensions related to the protruding members 6b: L1 . . . height of each member 6b from its upper end attached to the top plate 6 its lower end facing the disc 2; and L2 . . . gap between the lower end and the disc upper surface.

TABLE 1 shows simulation results with change in height L1 of each protruding member 6b.

TABLE 1

| | HEIGHT of PROTRUDING MEMBER L1 [mm] | | | | | | | |
| --- | --- | --- | --- | --- | --- | --- | --- | --- |
| | 0.5 | 0.6 | 0.7 | 0.8 | 0.9 | 1.0 | 1.1 | 1.2 |
| AIR-PRESSURE DIFFERENCE | NG | NG | GOOD | GOOD | GOOD | BEST | BEST | BEST |
| | HEIGHT of PROTRUDING MEMBER L1 [mm] | | | | | | | |
| | 1.3 | 1.4 | 1.5 | 1.6 | 1.7 | 1.8 | 1.9 | 2.0 |
| AIR-PRESSURE DIFFERENCE | BEST | BEST | BEST | GOOD | GOOD | NG | NG | NG |

TABLE 1 shows GOOD in air-pressure difference between the disc upper and lower surfaces with the height L1 ranging from 0.7 to 1.7 mm and BEST from 1.0 to 1.5 mm. Therefore, a preferable range of the height L1 for the protruding members 6b is from 0.7 to 1.7 mm, more preferably from 1.0 to 1.5 mm.

TABLE 2 shows simulation results with change in the number of the protruding member 6b.

protruding members 6b, according to the embodiment of the present invention.

Examined were disc floating and disc-surface fluctuation with change in the height L1 and the number of the protruding members 6b, and the gap L2 between the disc 2 and the members 6b, within the ranges shown in TABLES 1 to 3. Disc floating and disc-surface fluctuation are more restricted as the

TABLE 2

| | NUMBER OF PROTRUDING MEMBER | | | | | | | | | | | |
|---|---|---|---|---|---|---|---|---|---|---|---|---|
| | 5 | 6 | 7 | 8 | 9 | 10 | 11 | 12 | 13 | 14 | 15 | 16 |
| AIR-PRESSURE DIFFERENCE | NG | NG | NG | BEST | BEST | BEST | BEST | BEST | BEST | BEST | BEST | BEST |
| | NUMBER OF PROTRUDING MEMBER | | | | | | | | | | | |
| | 17 | 18 | 19 | 20 | 21 | 22 | 23 | 24 | 25 | 26 | 27 | 28 |
| AIR-PRESSURE DIFFERENCE | BEST | BEST | BEST | BEST | BEST | BEST | BEST | BEST | GOOD | GOOD | GOOD | GOOD |
| | NUMBER OF PROTRUDING MEMBER | | | | | | | | | | | |
| | 29 | 30 | 31 | 32 | 33 | 34 | 35 | 36 | 37 | 38 | 39 | 40 |
| AIR-PRESSURE DIFFERENCE | GOOD | GOOD | NG | NG | NG | NG | NG | NG | NG | NG | NG | NG |

TABLE 2 shows GOOD in air-pressure difference between the disc upper and lower surfaces with the number of protruding members 6b ranging from 8 to 30 and BEST from 8 to 24. Therefore, a preferable range of the number of the protruding members 6b is from 8 to 30, more preferably from 8 to 24.

Figure 11:
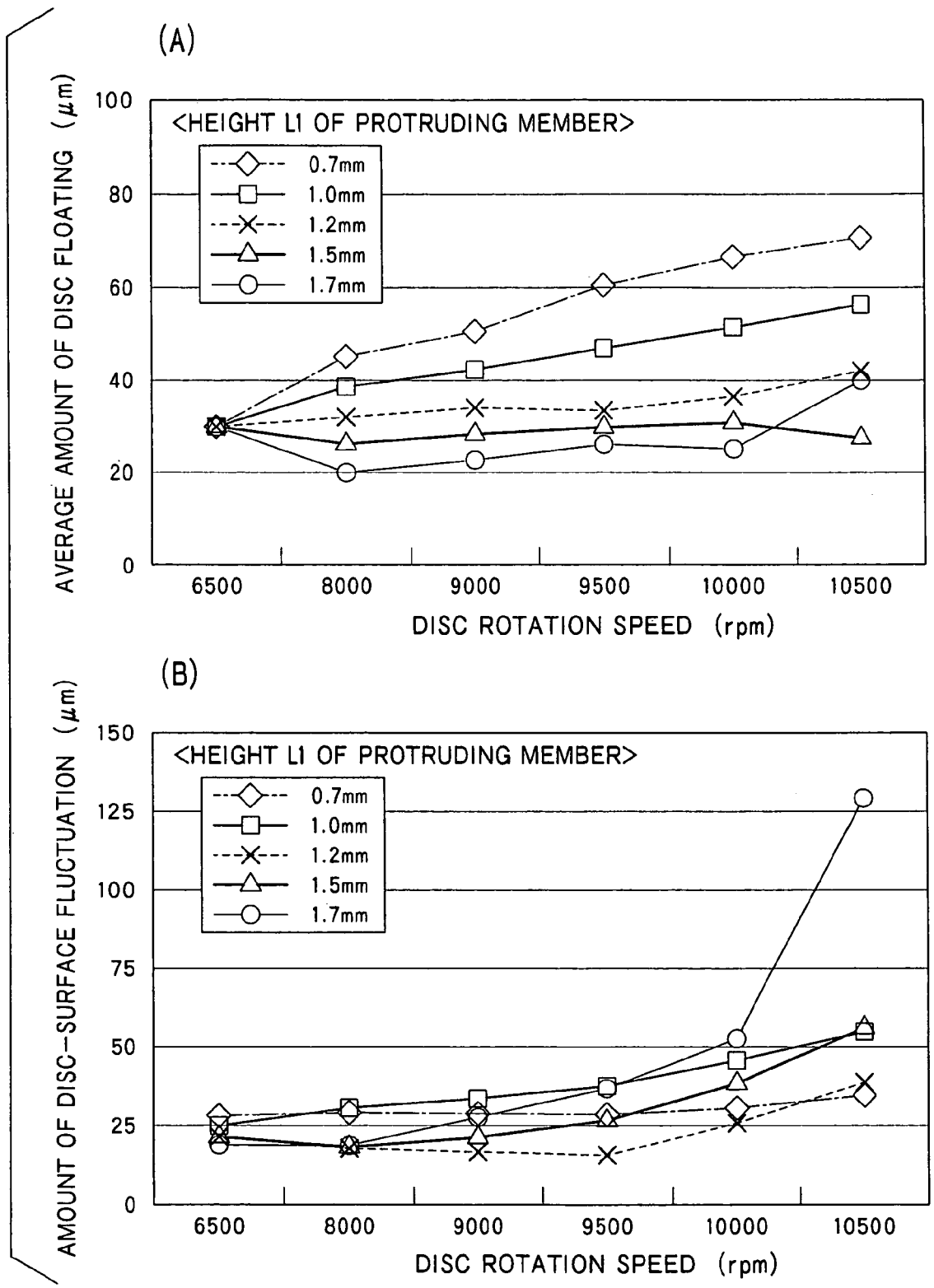
FIG. 11 shows change in disc floating and disc-surface fluctuation with change in height of the protruding members according to the embodiment of the present invention.
Figure 12:
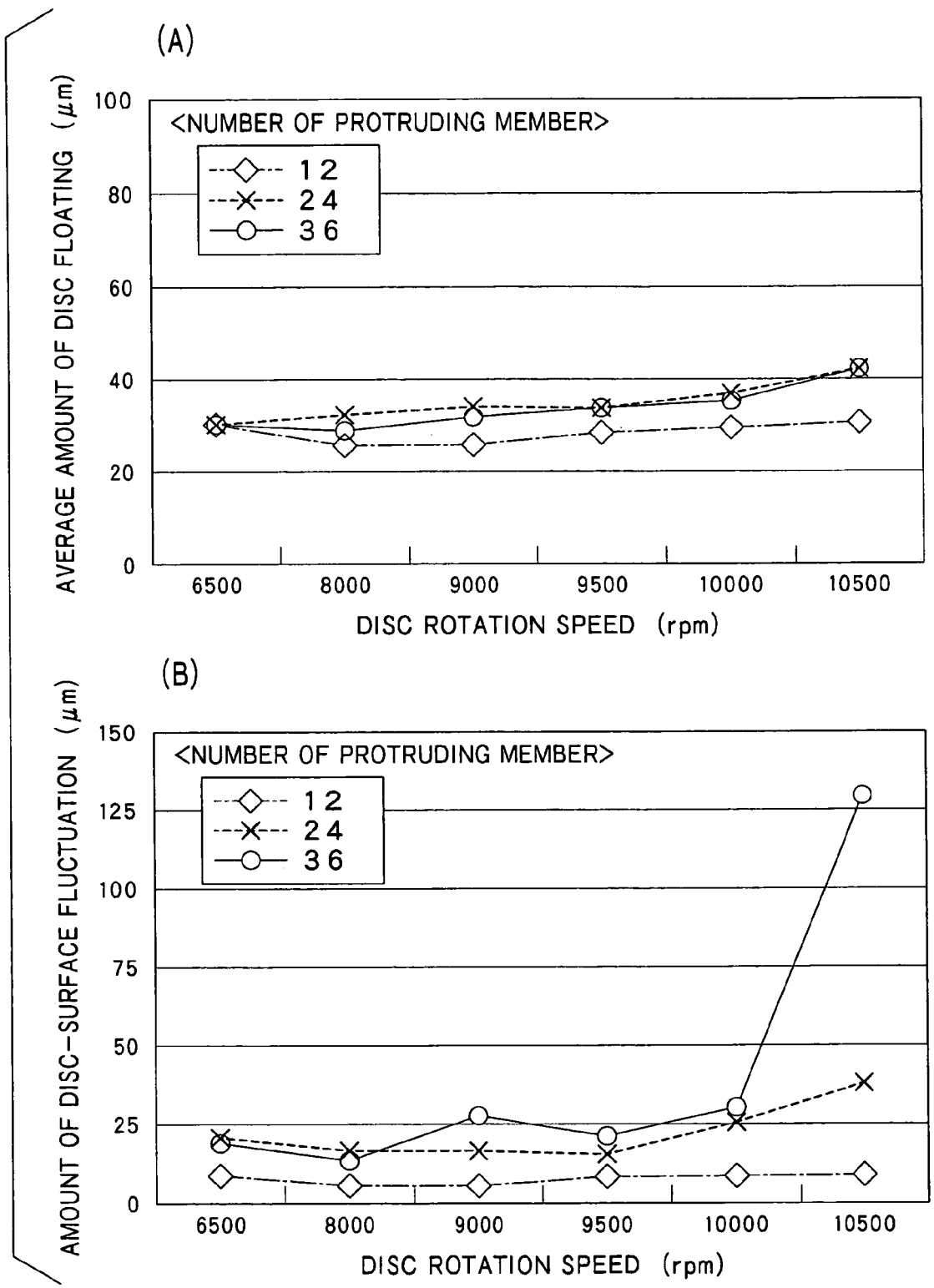
FIG. 12 shows change in disc floating and disc-surface fluctuation with change in the number of the protruding members according to the embodiment of the present invention.
Figure 13:
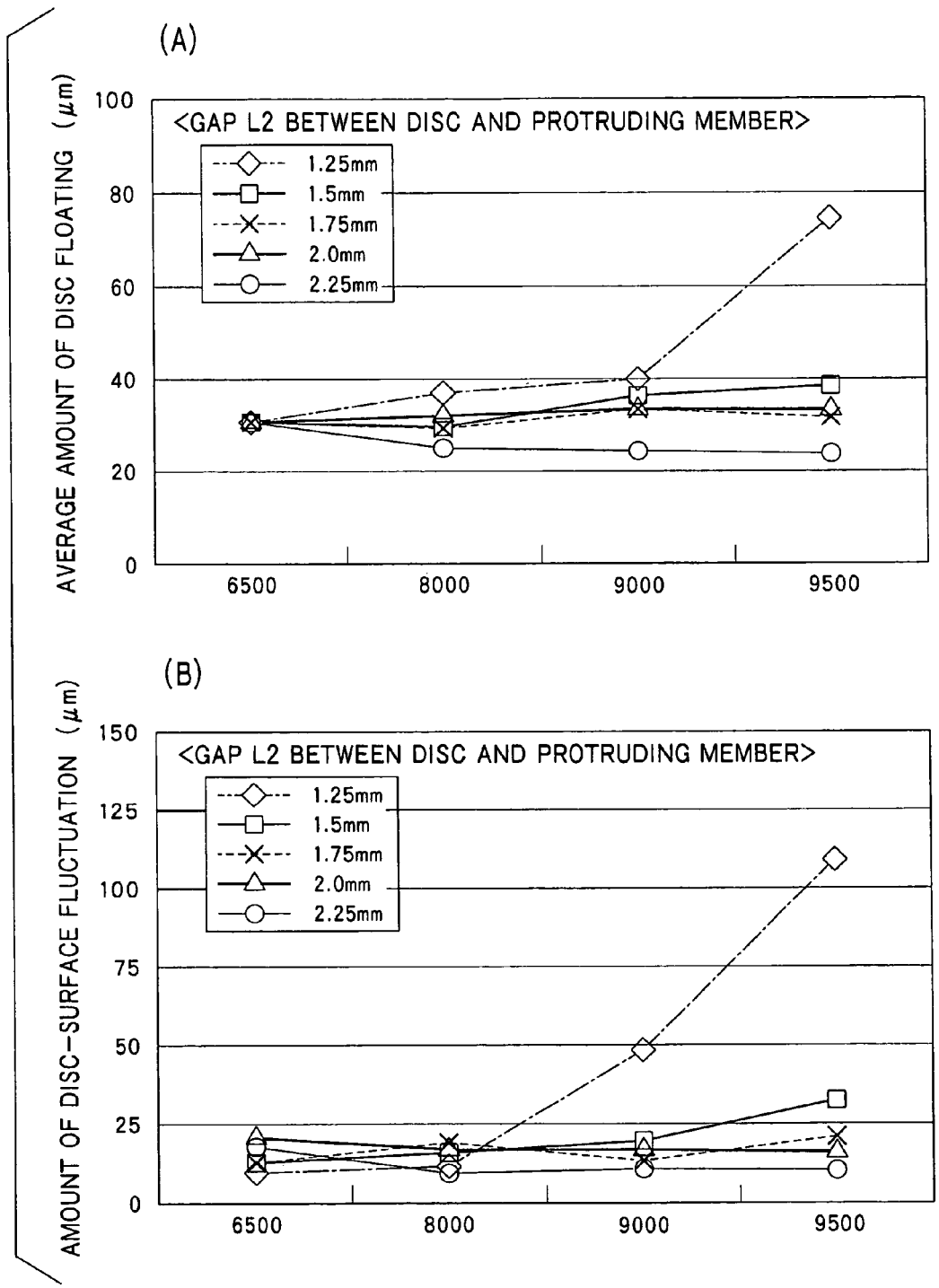
FIG. 13 shows change in disc floating and disc-surface fluctuation with change in gap between the protruding members and a disc according to the embodiment of the present invention.
Figure 14:
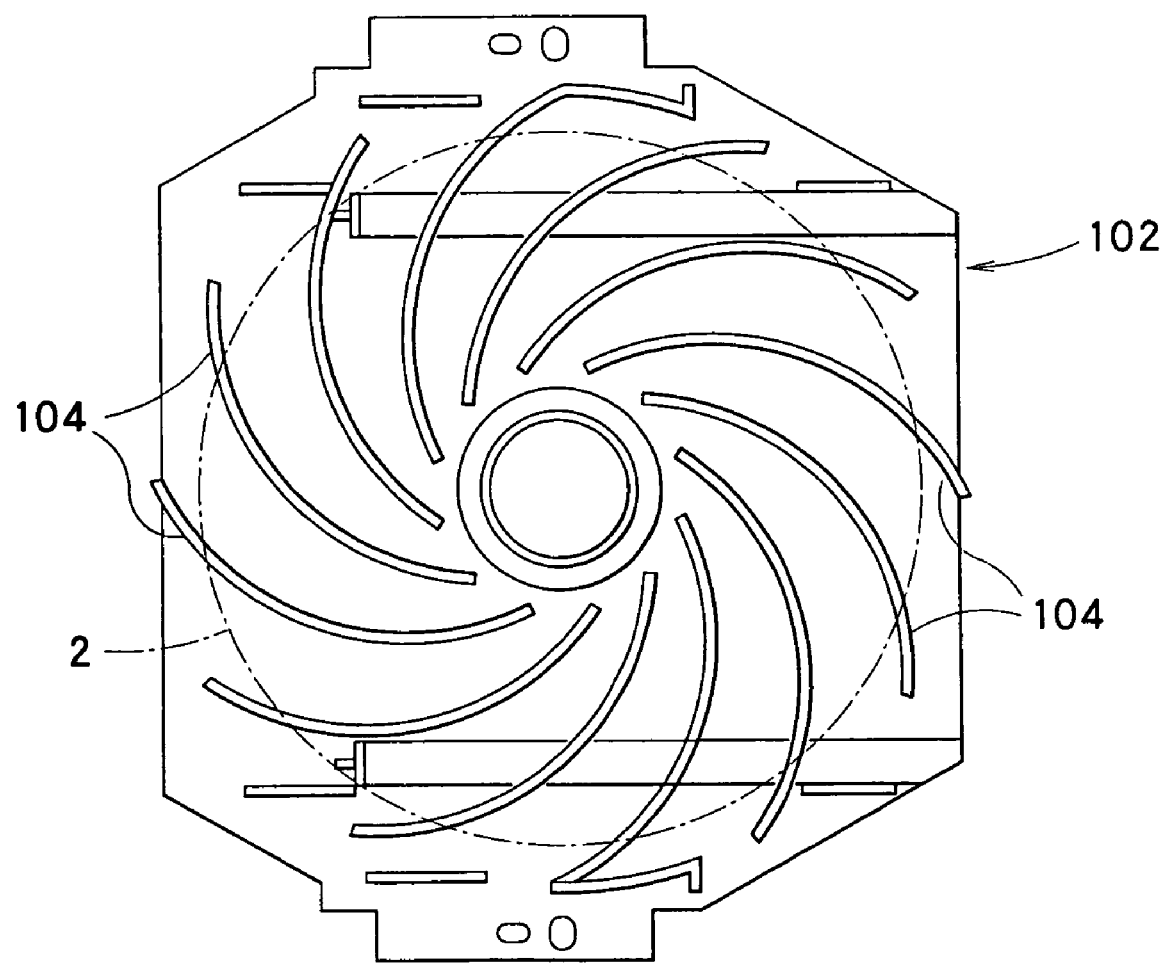
FIG. 14 is view showing a top plate that covers a housing of a known disc apparatus.

TABLE 3 shows simulation results with change in gap L2 between the protruding members 6b and the disc 2.

air-pressure difference between disc upper and lower surfaces becomes smaller. FIGS. 11 to 13 show change in disc floating or disc-surface fluctuation.

Figures (A) and (B) in FIG. 11 show change in disc floating and disc-surface fluctuation, respectively, at heights L1 of 0.7 mm, 1.0 mm, 1.2 mm, 1.5 mm, and 1.7 mm for the protruding

TABLE 3

| | Gap L2 [mm] | | | | | | | | |
|---|---|---|---|---|---|---|---|---|---|
| | 1.00 | 1.05 | 1.10 | 1.15 | 1.20 | 1.25 | 1.30 | 1.35 | 1.40 |
| AIR-PRESSURE DIFFERENCE | NG | NG | NG | NG | GOOD | GOOD | GOOD | GOOD | GOOD |
| | Gap L2 [mm] | | | | | | | | |
| | 1.45 | 1.50 | 1.55 | 1.60 | 1.65 | 1.70 | 1.75 | 1.80 | 1.85 |
| AIR-PRESSURE DIFFERENCE | GOOD | BEST | BEST | BEST | BEST | BEST | BEST | BEST | BEST |
| | Gap L2 [mm] | | | | | | | | |
| | 1.90 | 1.95 | 2.00 | 2.05 | 2.10 | 2.15 | 2.20 | 2.25 | 2.30 |
| AIR-PRESSURE DIFFERENCE | BEST | BEST | BEST | BEST | BEST | BEST | BEST | BEST | BEST |

TABLE 3 shows GOOD in air-pressure difference between the disc upper and lower surfaces with the gap L2 of 1.20 mm or more and BEST 1.50 mm or more. Therefore, a preferable gap L2 is 1.20 mm or more, more preferably 1.50 mm or more, but 3.0 mm or less, beyond which causes difficulty in clamping the disc 2 by the damp mechanism 7.

Further examinations were carried out to prove the simulation results, with several sample top plates 6 having the members 6b. In detail, the figure (A) in FIG. 11 shows the average amount of disc floating versus disc rotation speed, and the figure (B) in FIG. 11 the amount of disc-surface fluctuation versus disc rotation speed.

In this embodiment, the most acceptable are 60 μm or less for the average amount of disc floating and also 60 μm or less for the amount of disc-surface fluctuation at a high rotation speed of 8,000 rpm or higher.

The figure (A) in FIG. 11 shows that the average amount of disc floating becomes larger as the height L1 of each protruding member 6b is lowered. The height L1 must be at least 1 mm, according to the figure (A) in FIG. 11. As the height L1 becomes higher, the average amount of disc floating becomes smaller, whereas, the amount of disc-surface fluctuation becomes larger, as shown in the figure (B) in FIG. 11. The height L1 must be 1.5 mm or lower to restrict the disc-surface fluctuation to 60 µm or less at high speed rotation, according to the figure (B) in FIG. 11.

The reason why a lower height L1 for the protruding members 6b causes a larger disc floating amount is that it restricts an airflow from the disc outer to inner sections to lower the air pressure over the disc inner section. In contrast, the reason why a higher height L1 causes a larger disc-surface fluctuation amount is that it allows excess airflow from the disc outer to inner sections to cause a bigger difference in air pressure between the arc inner and outer sections of each protruding member 6b, resulting in air turbulence to fluctuate the disc 2.

Accordingly, the optimum range for the height L1 of the protruding members 6b is from 1.0 to 1.5 mm.

Figures (A) and (B) in FIG. 12 show change in disc floating and disc-surface fluctuation, respectively, at a height L1 of 1.2 mm for the protruding members 6b, with the number of the members 6b at 12, 24 and 36. In detail, the figure (A) in FIG. 12 shows the average amount of disc floating versus disc rotation speed, and the figure (B) in FIG. 12 the amount of disc-surface fluctuation versus disc rotation speed.

The figure (A) in FIG. 12 shows that the average amount of disc floating is more or less constant against change in the number of the protruding members 6b. In contrast, The figure (B) in FIG. 12 shows that the amount of disc-surface fluctuation becomes suddenly larger at a higher rotation speed as the number of the protruding members 6b increases. The fluctuation is caused by resonance of the disc 2 that occurs at an external stimulus frequency made closer to a high-order resonance frequency of the disc 2 due to air turbulence between the disc inner and outer sections.

The optimum number of the protruding members 6b is 24 or less, according to the figures (A) and (B) in FIG. 12. TABLE 2 also shows that the number of protruding members 6b ranging from 8 to 24 gives BEST to the air-pressure difference between the disc upper and lower surfaces. Accordingly, the optimum range for the number of protruding members 6b is from 8 to 24.

Figures (A) and (B) in FIG. 13 show change in disc floating and disc-surface fluctuation, respectively, with 12 protruding members 6b having a height L1 of 1.2 mm, at gaps L2, between the disc 2 and the members 6b, of 1.25 mm, 1.5 mm, 1.75 mm, 2 mm, and 2.25 mm. In detail, the figure (A) in FIG. 13 shows the average amount of disc floating versus disc rotation speed, and the figure (B) in FIG. 13 the amount of disc-surface fluctuation versus disc rotation speed.

The figures (A) and (B) in FIG. 13 show that the average amount of disc floating and the amount of disc-surface fluctuation are both increased at high rotation speeds as the gap L2 between the disc 2 and the protruding members 6b narrows. This is caused by decrease in air pressure over the disc inner section due to restriction of an airflow from the disc outer to inner sections which is caused by delay in airflow between the disc 2 and the members 6b when gap L2 narrows.

The optimum gap L2 is 1.5. mm or wider, according to the figures (A) and (B) in FIG. 13.

As discussed above, the following requirements are confirmed for a smaller difference in air pressure applied to the upper and lower surfaces of the disc 2 rotating at a high speed.

Height L1 of each protruding member 6b from its upper end attached to the top plate 6: 0.7 mm to 1.7 mm;
The number of the members 6b: 8 to 30; and
Gap L2 between the disc 2 and the members 6b: 1.2 mm to 3.0 mm.

Moreover, the optimum requirements for effectively restricting disc floating and disc-surface fluctuation are as follows:

Height L1: 1.0 mm to 1.5 mm;
The number of the protruding members 6b: 8 to 24; and
Gap L2: 1.5 mm to 3.0 mm.

As disclosed in detail, the present invention with the requirements listed above for the height L1, the number of the protruding member, and the gap L2 effectively restricts decrease in air pressure on the disc inner section when the disc 2 is rotating at a high speed.

Moreover, the present invention effectively restricts disc floating and thus prevents the disc 2 from being released from the clamp mechanism 7.

Furthermore, the present invention effectively lowers the negative air pressure applied to the disc upper surface to push the disc 2 to the motor 11, thus restricting disc-surface fluctuation in high-speed rotation, even if the disc 2 has the center of gravity displaced from the original point, which offers stable recording or reproduction.

Moreover, with achievement of such restriction of disc-surface fluctuation, the present invention provides a high-quality disc apparatus that produces less noise.

What is claimed is:

1. A disc apparatus for recording or reading data to or from a disc comprising:
    a tray having a table on which the disc is placed; and
    a shielding member that covers the tray, the shielding member having a circular opening and a plurality of arc protruding members, each arc protruding member being provided on an inner surface of the shielding member that covers the tray as protruding towards an upper surface of the disc placed on the table of the tray, an end of each arc protruding member being situated near the opening, and each arc protruding member having a protruding end with a height ranging from 1.0 mm to 1.5 mm from the inner surface of the shielding member,
    wherein the shielding member has an inner circular portion and an outer circular portion both provided on the inner surface of the shielding member, the inner circular portion is provided along the circular opening as a thick wall portion formed as protruding from the shielding member and having a step protruding inwardly in radial direction from the opening, the outer circular portion is concentric with the opening and formed as protruding from the shielding member, and the arc protruding members are provided as connecting the inner and outer portions.

2. The disc apparatus according to claim 1, wherein the arc protruding members are oriented in the same direction between the inner and outer portions.

3. The disc apparatus according to claim 1, wherein the arc protruding members have the same radius.

4. The disc apparatus according to claim 1, wherein ends of the arc protruding member situated near the opening are separated from one another along a circumference of the inner circular portion.

5. The disc apparatus according to claim 4, wherein ends of the arc protruding member are separated from one another with a constant interval.

6. The disc apparatus according to claim 1, wherein the protruding end of each arc protruding member is separated by a gap in a range from a first value that is larger than 1.5 mm to a second value that is equal to or smaller than 3.0 mm from the upper surface of the disc placed on the table of the tray.

7. A disc apparatus for recording or reading data to or from a disc comprising:

a tray having a table on which the disc is placed; and a shielding member that covers the tray, the shielding member having a circular opening and a plurality of arc protruding members, each arc protruding member being provided on an inner surface of the shielding member that covers the tray as protruding towards an upper surface of the disc placed on the table of the tray, an end of each arc protruding member being situated near the opening and each arc protruding member having a protruding end with a height ranging from 1.0 mm to 1.5 mm from the inner surface of the shielding member, wherein the number of the arc protruding members is 12 or more, but 24 or less, and the protruding end of each arc protruding member is separated by a gap in a range from a first value that is larger than 1.5 mm to a second value that is equal to or smaller than 3.0 mm from the upper surface of the disc placed on the table of the tray.

* * * * *